Patented June 27, 1933

1,915,748

UNITED STATES PATENT OFFICE

MANFRED MUELLER, OF HAMBURG (NIEDERRHEIN), GERMANY, ASSIGNOR TO SACHTLEBEN AKTIENGESELLSCHAFT FÜR BERGBAU UND CHEMISCHE INDUSTRIE, OF COLOGNE-ON-THE-RHINE, GERMANY

PROCESS FOR MANUFACTURING BARIUM SULPHATE OF DEFINITE GRANULE SIZE

No Drawing. Application filed April 22, 1931, Serial No. 532,136, and in Germany April 28, 1930.

This invention relates to the production of barium sulphate, the granule size of which is capable of being arbitrarily fixed and which may be chosen of the order ranging from the finest granule size up to that equal to coarsely crystalline ground natural heavy spar.

For many purposes, such as for example, in the paint industry, a coarser granule is required than is obtained in the case of barium sulphate precipitated by the known processes, i. e. so-called permanent white or blanc fixé. Of course, processes are known for increasing the granule size during the precipitation, for example, for the so-called matt goods of commerce, but the granule size of this material is still too fine for many purposes. For example, it cannot be used in the paint industry in place of natural ground heavy spar.

The use of a not too finely granular heavy spar is of importance, more particularly for adulteration, i. e. admixing to lithopone. As is well known lithopone is a mixture of barium sulphate and zinc sulphide. It occurs in commerce in various kinds which are characterized by a coloured seal according to their zinc sulphide content. "Red seal" lithopone, having a content of 30% zinc sulphide and 70% barium sulphate, is the kind mostly used. This kind may be made in two ways. Either molecular quantities of barium sulphide and zinc sulphate may be allowed to interact with one another and in this way the so-called purely precipitated material be obtained, or a lithopone having a higher zinc sulphide content may be made and this may then be adulterated with barium sulphate until the content corresponds to the desired seal.

By adulteration is here understood merely the admixing of the dry product at the end of the production process of a pigment or the subsequent adulteration of the pigment with the adulterating spar, and not the chemical precipitation of barium sulphate within the pigment, such as is effected, for example, in the production of lithopone (or other pigments) in the first named manner. The adulterating spar may be added to the lithopone at any desired stage of the manufacturing process.

Hitherto only naturally occurring barium surphate, the heavy spar, was used for the adulteration, which had been ground to maximum fineness and usually subjected to a purification process according to the purity in which it occurs. In this form it is used as the so-called adulterating spar for lithopone as well as for pigments in general.

Hitherto it has been practically unadvisable to use the barium sulphate made according to the known processes by chemical interaction (permanent white or blanc fixé) for adulteration of pigments, although this is considerably superior to natural adulterating spar as regards whiteness. The reason for this is that the use of the binding agent which, in addition to the covering power, granule fineness and so forth is decisive when judging a pigment, is very much higher in the case of ordinary finely granular permanent white than in the case of natural ground heavy spar.

The object of the present invention is so to change the structure of permanent white precipitated from barium salts in the known manner that it passes over into a coarsely crystalline substance and consequently assumes the physical properties of such a substance as well.

It has been found that blanc fixé prepared in any desired manner may be converted into a coarsely crystalline product if a small content of fusion agent in the form of compounds of alkalies and alkaline earths, such as their oxides, hydroxides, carbonates, chlorides, sulphides, sulphates and others, is incorporated with the finely granular preparation and the dried blanc fixé is then ignited at temperatures of 300° C. to 1000° C. and above, according as whether it is desired to obtain a finer or coarser crystalline structure for the blanc fixé. A content of about 0.1% of the fusion agent is already sufficient; however, larger quantities of the same may also be used. The water soluble reaction products which are formed during the precipitation of the blanc fixé may also advantageously be used as fusion agents, these salts being only incompletely washed out and the precipitate then ignited. In this way up to about 3% of the salts remain in the precipitate. The higher the temperature of ignition the more coarsely crystalline is the ignited product. Whereas the particle size of ordinary blanc fixé amounts on an average to 0.001 mm., the present process provides crystals of the order of about 0.04 mm. in size.

The duration of the ignition amounts approximately to 1–2 hours; the higher the temperature of ignition the shorter is the time to be adjusted. It is to be assumed as a measure that the ignition is to be continued until the material is sintered.

The ignited product may be allowed to cool and then ground; it may advantageously be chilled in water. By this means the incandescent hard lumps forthwith disintegrate to powder to a maximum extent, which latter is further worked up after washing.

The ignition and chilling of precipitated barium sulphate is in itself already known. It is new, however, to use these two expedients, or ignition alone, in the case of blanc fixé which contains a fusion agent; the effect consists in the fact that the granule size is changed.

The barium sulphate treated thus is ground and dried in the known manner.

It is also possible according to this process to make a very finely granular blanc fixé which does not meet, for example, the demands of the paper industry and frequently represents a bothersome waste product, valuable for other industries, for example, the paint industry, in place of adulterating spar.

*Examples*

(1) 1000 litres of barium sulphide liquor containing 135 g. of BaS per litre are stirred up at 50° C. with Glauber's salt solution containing 200 g. of $Na_2SO_4$ per litre until all the barium sulphide is precipitated and a small excess of Glauber's salt remains in the solution. 20 kg. of common salt are added and, after it has entered solution, the precipitate is separated from the liquor containing sodium sulphide and sodium chloride. Without further washing the barium sulphate obtained the latter is dried and ignited at a temperature of 650° C.

(2) 1000 litres of barium chloride liquor containing 220 g. of $BaCl_2$ per litre are precipitated at 50° C. with 1000 litres of a Glauber's salt solution containing 150 g. of $Na_2SO_4$ per litre, 246 kg. of barium sulphate being obtained. The precipitate is separated from the liquor containing sodium chloride, and, without further washing, is dried and ignited for two hours at 700° C.

The still incandescent barium sulphate obtained in accordance with Examples 1 and 2 may be chilled in water; this brings about immediate removal of the fusion agent by dissolution and as a result the grinding which is afterwards effected in the known manner is facilitated.

I am aware that in Patent No. 1,468,867 a process is described in which barium sulphate prepared by precipitation of barium sulphide with a solution of sodium sulphate is thoroughly washed and calcined at say 900° C., whereby its bulk is diminished. The barium sulphate resulting from the thorough washing contains a fraction of a percent of sodium sulphate, usually 0.1–0.5%, in actual combination therewith. This adsorbed sulphate is insufficient to produce the effect obtained by the present invention, i. e., an arbitrary variation in the granule size of the barium sulphate; freely admixed and not absorbed salt is necessary in order to produce this effect. The invention claimed by me is limited to the fusion treatment of precipitated barium sulphate containing freely admixed, as distinct from adsorbed or otherwise combined, fusion agent.

What I claim is:

1. Process for making barium sulphate of definite granule size consisting in adding small quantities of a fusion agent to unwashed precipitated barium sulphate, and igniting at temperatures of 300 to 1000° C. and above according to the degree of fineness of the crystals desired.

2. Process for making barium sulphate of definite granule size consisting in adding small quantities of an alkali compound to unwashed precipitated barium sulphate, and igniting at temperatures of 300 to 1000° C. and above according to the degree of fineness of the crystals desired.

3. Process for making barium sulphate of definite granule size consisting in adding small quantities of an alkaline earth compound to unwashed precipitated barium sulphate, and igniting at temperatures of 300 to 1000° C. and above according to the degree of fineness of the crystals desired.

4. Process for making barium sulphate of definite granule size consisting in precipitating barium sulphate, incorporating with the unwashed precipitate small quantities of the water soluble alkali salts arising during the precipitation, and igniting the precipitate at temperatures of 300 to 1000° C. and above according to the degree of fineness of the crystals desired.

5. Process for making barium sulphate of definite granule size consisting in precipitating barium sulphate, incorporating with the unwashed precipitate small quantities of the water soluble alkaline earth salts arising during the precipitation, and igniting the precipitate at temperatures of 300 to 1000° C. and above according to the degree of fineness of the crystals desired.

6. In the process claimed in claim 1, chilling the ignited barium sulphate in water.

7. In the process claimed in claim 2 chilling the ignited barium sulphate in water.

8. In the process claimed in claim 3 chilling the ignited barium sulphate in water.

9. In the process claimed in claim 4 chilling the ignited barium sulphate in water.

In testimony whereof I hereunto affix my signature this 8th day of April 1931.

MANFRED MUELLER.